United States Patent
Henry

(10) Patent No.: US 12,185,650 B2
(45) Date of Patent: Jan. 7, 2025

(54) SYSTEM AND METHOD FOR CONTROLLING THE OPERATION OF AN AGRICULTURAL IMPLEMENT BASED ON COMPACTION LAYER POSITION

(71) Applicant: CNH Industrial Canada, Ltd., Saskatoon (CA)

(72) Inventor: James W. Henry, Saskatoon (CA)

(73) Assignee: CNH Industrial Canada, Ltd. (CA)

( * ) Notice: Subject to any disclaimer, the term of this patent is extended or adjusted under 35 U.S.C. 154(b) by 679 days.

(21) Appl. No.: 17/162,175

(22) Filed: Jan. 29, 2021

(65) Prior Publication Data
US 2022/0240430 A1    Aug. 4, 2022

(51) Int. Cl.
| | | |
|---|---|---|
| *A01B 63/24* | (2006.01) | |
| *A01B 3/26* | (2006.01) | |
| *A01B 13/14* | (2006.01) | |
| *A01B 79/00* | (2006.01) | |

(52) U.S. Cl.
CPC .............. *A01B 63/24* (2013.01); *A01B 3/26* (2013.01); *A01B 13/14* (2013.01); *A01B 79/005* (2013.01)

(58) Field of Classification Search
CPC ........... A01B 63/24; A01B 3/26; A01B 13/14; A01B 79/005
See application file for complete search history.

(56) References Cited

U.S. PATENT DOCUMENTS

| | | | |
|---|---|---|---|
| 8,827,001 B2 | 9/2014 | Wendte et al. | |
| 10,262,413 B2 | 4/2019 | Strnad et al. | |
| 2018/0128933 A1* | 5/2018 | Koch et al. | G01V 3/12 |
| 2018/0160613 A1 | 6/2018 | Kovach et al. | |

(Continued)

FOREIGN PATENT DOCUMENTS

| | | |
|---|---|---|
| BR | 102015030677 | 6/2017 |
| WO | WO2019/158454 A1 | 8/2019 |
| WO | WO2022/072345 A1 | 4/2022 |

OTHER PUBLICATIONS

Fox, "Real-Time, Variable-Depth Tillage for Managing Soil Compaction in Cotton Production," Tiger Prints, Clemson University, Dated May 2018 (67 pages) https://tigerprints.clemson.edu/cgi/viewcontent.cgi?article=3904&context=all theses.

(Continued)

*Primary Examiner* — Tara Mayo
(74) *Attorney, Agent, or Firm* — Rebecca Henkel; Peter K. Zacharias; Rickard K. DeMille

(57) ABSTRACT

A system for controlling an operation of an agricultural implement includes a ground-penetrating tool configured to penetrate soil within a field to a penetration depth. Furthermore, the system includes a sensor configured to capture data indicative of a compaction layer within the field as the implement travels across the field. Additionally, the system includes a computing system configured to generate a representation of a portion of the soil within the field based on the data captured by the sensor. Moreover, the computing system is configured to determine a position of a bottom surface of the compaction layer based on the generated representation. In addition, the computing system is configured to control the penetration depth of the ground-penetrating tool based on the determined position of the bottom surface of the compaction layer.

18 Claims, 5 Drawing Sheets

(56) References Cited

U.S. PATENT DOCUMENTS

| | | |
|---|---|---|
| 2018/0206393 A1 | 7/2018 | Stoller et al. |
| 2019/0320574 A1 | 10/2019 | Andrejuk et al. |
| 2020/0084954 A1 | 3/2020 | Sporrer et al. |
| 2020/0113123 A1 | 4/2020 | Shearer et al. |
| 2020/0255140 A1 | 8/2020 | Nahuel-Andrejuk et al. |
| 2021/0105931 A1 | 4/2021 | Anderson, Jr. et al. |
| 2022/0022362 A1 | 1/2022 | Anderson, Jr. et al. |

OTHER PUBLICATIONS

Grift et al., "Acoustic Compaction Layer Detection," American Society of Agricultural Engineers, Dated Jul. 2005 (8 pages) https://www.ars.usda.gov/ARSUserFiles/60100500/csr/ResearchPubs/raper/raper_05e.pdf.

Adamchuk et al., "On-the-go Soil Sensors for Precision Agriculture," Biological Systems Engineering: Papers and Publications, University of Nebraska, Dated Jun. 12, 2004 (22 pages) https://digitalcommons.unl.edu/cgi/viewcontent.cgi?article=1000&context-biosysengfacpub.

Extended European Search Report issued in corresponding EP Application No. EP22154085, mailed Jun. 29, 2022, (8 pages).

\* cited by examiner

SYSTEM AND METHOD FOR CONTROLLING THE OPERATION OF AN AGRICULTURAL IMPLEMENT BASED ON COMPACTION LAYER POSITION

FIELD OF THE INVENTION

The present disclosure generally relates to agricultural implements and, more particularly, to systems and methods for controlling the operation of an agricultural implement based on compaction layer position.

BACKGROUND OF THE INVENTION

It is well known that, to attain the best agricultural performance from a piece of land, a farmer must cultivate the soil, typically through a tillage operation. Common tillage operations include plowing, harrowing, and subsoiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing certain tillage operations, it is generally desirable to break up any layers of subsurface soil that have been compacted (e.g., due to vehicle traffic, ponding, and/or the like). As such, during such tillage operations, shanks or other ground-penetrating tools supported on the tillage implement are pulled through the soil to fracture the compaction layer. However, the depth of the compaction layer may vary throughout the field. In this respect, systems have been developed that allow compaction layers to be detected and the penetration depths of the shanks or other tools to be adjusted accordingly. While such systems work well, further improvements are needed.

Accordingly, an improved system and method for controlling the operation of an agricultural implement would be welcomed in the technology. In particular, a system and method for controlling the operation of an agricultural implement that provides improved fracturing of subsurface soil compaction layers would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling an operation of an agricultural implement. The system includes a ground-penetrating tool configured to penetrate soil within a field to a penetration depth. Furthermore, the system includes a sensor configured to capture data indicative of a compaction layer within the field as the agricultural implement travels across the field. The compaction layer, in turn, extends in a vertical direction between a bottom surface of the compaction layer and a top surface of the compaction layer. Additionally, the system includes a computing system communicatively coupled to the sensor. In this respect, the computing system is configured to generate a representation of a portion of the soil within the field based on the data captured by the sensor. Moreover, the computing system is configured to determine a position of the bottom surface of the compaction layer based on the generated representation. In addition, the computing system is configured to control the penetration depth of the ground-penetrating tool based on the determined position of the bottom surface of the compaction layer.

In another aspect, the present subject matter is directed to a method for controlling an operation of an agricultural implement. The agricultural implement, in turn, includes a ground-penetrating tool configured to penetrate soil within a field to a penetration depth. The method includes receiving, with a computing system, sensor data indicative of a compaction layer within the field as the agricultural implement travels across the field. The compaction layer, in turn, extends in a vertical direction between a bottom surface of the compaction layer and a top surface of the compaction layer. Furthermore, the method includes generating, with the computing system, a representation of a portion of the soil within the field based on the received sensor data. Additionally, the method includes determining, with computing system, a position of the bottom surface of the compaction layer based on the generated representation. Moreover, the method includes controlling, with computing system, the penetration depth of the ground-penetrating tool based on the determined position of the bottom surface of the compaction layer.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
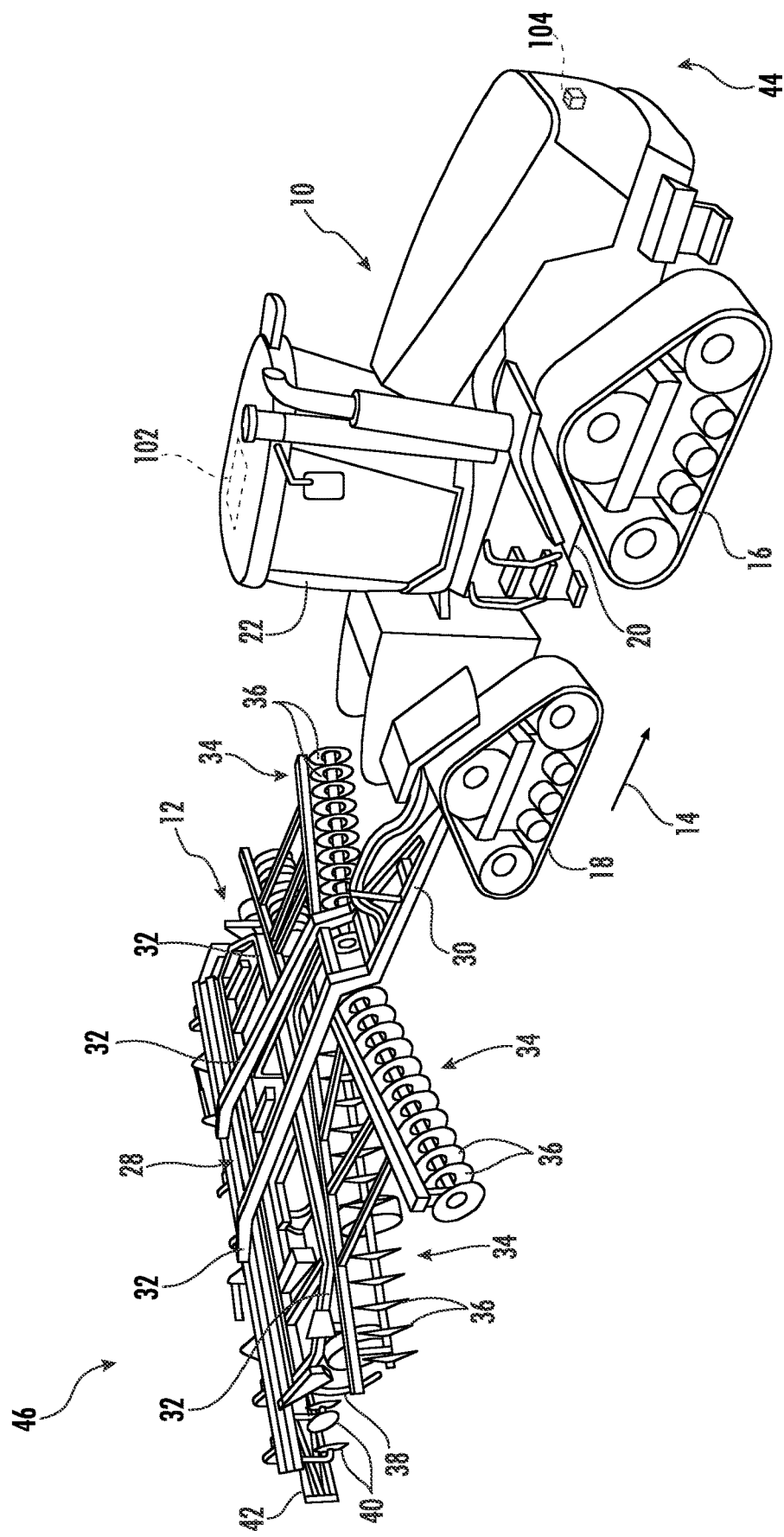
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural implement. Specifically, the system may include a sensor configured to capture data indicative of a compaction layer present within the field as the agricultural implement travels across the field. The compaction layer may, in turn, extend in the vertical direction between a bottom surface of the compaction layer and a top surface of the compaction layer. For example, in one embodiment, the sensor may include a ground-penetrating radar (GPR) sensing device and an electromagnetic induction (EMI) sensing device.

In several embodiments, a computing system may be configured to control the penetration depth(s) of one or more ground-penetrating tools of the agricultural implement based on the position of the bottom surface of the compaction layer. As the implement travels across the field, the computing system may generate a representation of a portion of the soil within the field based on the data captured by the sensor. Furthermore, the computing system may determine the position of the bottom surface of the compaction layer based on the generated representation. Thereafter, the computing system may control the penetration depth(s) of the ground-penetrating tool(s) such that the tip(s) of the tool(s) is positioned below the bottom surface of the compaction layer. Specifically, in some embodiments, the computing system may control the penetration depth(s) of the ground-penetrating tool(s) such that the tip(s) of the tool(s) is maintained at a selected distance below the bottom surface of the compaction layer.

Controlling the penetration depth(s) of the ground-penetrating tool(s) based on the position of the bottom surface of the compaction layer generally improves fracturing of the compaction layer. As will be described below, the selected distance between the tool(s) and the bottom surface of the compaction layer may be determined based on one or more parameters associated with the compaction layer, such as the position of the bottom surface of the compaction layer, the thickness of the compaction layer, the density of the compaction layer, the type of soil within the field, and/or the moisture content of the soil within the field. In this respect, by maintaining the tip(s) of the ground-penetrating tool(s) at the selected distance below the bottom surface of the compaction layer, the ground-penetrating tool(s) can more fully fracture the compaction layer than when the tool(s) simply penetrate into the compaction layer. Moreover, maintaining the tip(s) of the ground-penetrating tool(s) at the selected distance below the bottom surface of the compaction layer allows for full fracturing of the compaction without the large an unnecessary increase in draft load associated with sinking the tool(s) into the soil well below the depth of the compaction layer.

Referring now to the drawings, FIG. 1 illustrates a perspective view of one embodiment of a work vehicle 10 and an associated agricultural implement 12 in accordance with aspects of the present subject matter. In general, the work vehicle 10 may be configured to tow the implement 12 across a field in a direction of travel (e indicated by arrow 14). As such, in one embodiment, the work vehicle 10 may be configured as an agricultural tractor and the implement 12 may be configured as a tillage implement. However, in other embodiments, the work vehicle 10 may be configured as any other suitable work vehicle. Similarly, the implement 12 may be configured as any other suitable agricultural implement.

As shown, the work vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface) for permitting an operator to control the operation of one or more components of the work vehicle 10 and/or one or more components of the implement 12.

Additionally, as shown in FIG. 1, the implement 12 may generally include a frame 28 configured to be towed by the vehicle 10 via a pull hitch or tow bar 30 in the direction of travel 14. In general, the frame 28 may include a plurality of structural frame members 32, such as beams, bars, and/or the like, configured to support or couple to a plurality of components. As such, the frame 28 may be configured to support a plurality of ground-engaging and/or ground-penetrating tools, such as a plurality of shanks, disk blades, leveling blades, basket assemblies, tines, spikes, and/or the like. In one embodiment, the various ground-engaging and/or ground-penetrating tools may be configured to perform a tillage operation or any other suitable ground-engaging operation on the field across which the implement 12 is being towed. For example, in the illustrated embodiment, the frame 28 is configured to support various gangs 34 of disk blades 36, a plurality of ground-penetrating shanks 38, a plurality of leveling blades 40, and a plurality of crumbler wheels or basket assemblies 42. However, in alternative embodiments, the frame 28 may be configured to support any other suitable ground-engaging tool(s), ground-penetrating tool(s), or combinations of such tools.

Moreover, a location sensor 102 may be provided in operative association with the vehicle 10 and/or the implement 12. For instance, as shown in FIG. 1, the location sensor 102 is installed on or within the vehicle 10. However, in other embodiments, the location sensor 102 may be installed on or within the implement 12. In general, the location sensor 102 may be configured to determine the current location of the vehicle 10 and/or the implement 12 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a computing system of the vehicle 10 and/or the implement 12 (e.g., in the form coordinates) and stored within the computing system's memory for subsequent processing and/or analysis. For instance, based on the known dimensional configuration and/or relative positioning between the vehicle 10 and the implement 12, the determined location from the location sensor 102 may be used to geo-locate the implement 12 within the field.

Furthermore, a soil sensor 104 may be provided in operative association with the vehicle 10 and/or the implement 12. In general, the soil sensor 104 may be configured to capture data indicative of a subsurface soil compaction layer present within the field as the vehicle/implement 10/12 travels across the field. As will be described below, the data captured by the soil sensor 104 may be used to identify the position the bottom surface of the compaction layer. In this respect, the soil sensor 104 may be a non-contact-based sensor installed or otherwise supported on the vehicle 10 and/or the implement 12 such that the sensor 104 has a field of view or sensor detection range directed towards a portion of the field adjacent to the vehicle/implement 10/12. For example, as shown in FIG. 1, in one embodiment, the soil sensor 104 may be mounted on a forward end 44 of the work vehicle 10 to capture data associated with a portion of the soil within the field disposed in front of the vehicle 10 relative to the direction of travel 14. However, in alternative embodiments, the soil sensor 104 may be installed at any other suitable location on the vehicle 10 and/or the implement 12. Additionally, in some embodiments, the vehicle/implement 10/12 may include more than one soil sensor 104.

Figure 2:
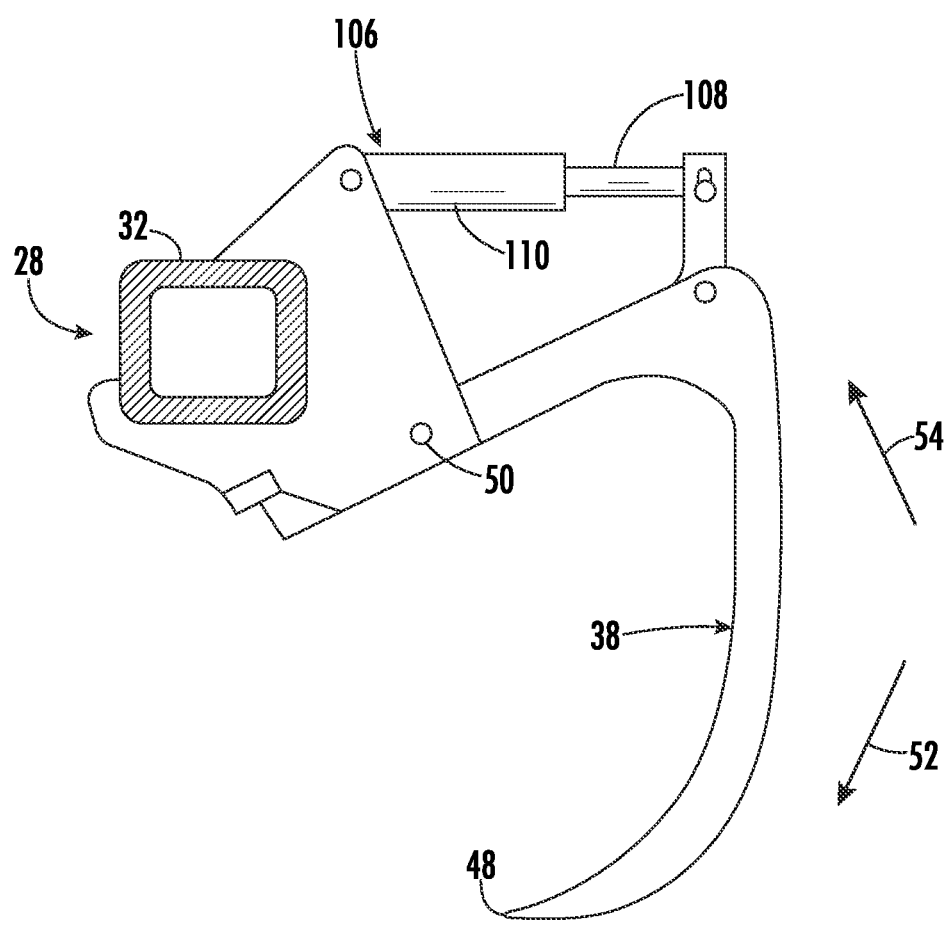
FIG. 2 illustrates a side view of one embodiment of a shank of an agricultural implement in accordance with aspects of the present subject matter.

Referring now to FIG. 2, a side view of one embodiment of one of the shanks 38 of the implement 12 described above with reference to FIG. 1 is illustrated in accordance with aspects of the present subject matter. As indicated above, the shanks 38 may be configured to till or otherwise cultivate the soil. In this regard, one end of each shank 38 may include a tip 48 configured to penetrate the soil within the field to a penetration depth as the implement 12 is pulled across the field. The opposed end of each shank 38 may be pivotally coupled to the implement frame 28, such as at pivot point 50. As such, each shank 38 may be configured to pivot relative to the frame 28 in a manner that adjusts its penetration depth. In one embodiment, the various shanks 38 of the implement 12 may be configured as rippers. However, in alternative embodiments, the shanks 38 may be configured as chisels, sweeps, tines, or any other suitable type of shanks. Furthermore, the other shanks coupled to the frame 28 may have the same or a similar configuration to as the shank 38 shown in FIG. 2.

In several embodiments, the implement 12 may include one or more ground-penetrating tool actuators 106, with each actuator 106 coupled between the frame 28 and each shank 38. In general, each actuator 106 may be configured to move or otherwise adjust the orientation or position of the corresponding shank 38 relative to the implement frame 28 in a manner that adjusts the penetration depth of the shank 38. More specifically, as shown in the illustrated embodiment, a first end of each actuator 106 (e.g., a rod 108 of each actuator 106) is coupled to the corresponding shank 38, while a second end of each actuator 106 (e.g., a cylinder 110 of each actuator 106) is coupled to the frame 28. As such, the rod 108 of each actuator 106 may be configured to extend relative to the corresponding cylinder 110 to pivot the corresponding shank 38 relative to the frame 28 in a first pivot direction (indicated by arrow 52), thereby increasing the penetration depth of the shank 38. Conversely, the rod 108 of each actuator 106 may be configured to retract relative to the corresponding cylinder 110 to pivot the corresponding shank 38 relative to the frame 28 in a second pivot direction (indicated by arrow 54), thereby decreasing the penetration depth of the shank 38. In the illustrated embodiment, each actuator 106 corresponds to a fluid-driven actuator, such as a hydraulic or pneumatic cylinder. However, in alternative embodiments, each actuator 106 may correspond to any other suitable type of actuator, such as an electric linear actuator.

It should be further appreciated that the configuration of the work vehicle 10 and the agricultural implement 12 described above and shown in FIGS. 1 and 2 is provided only to place the present subject matter in an exemplary field of use. Thus, it should be appreciated that the present subject matter may be readily adaptable to any manner of agricultural machine configuration.

Figure 3:
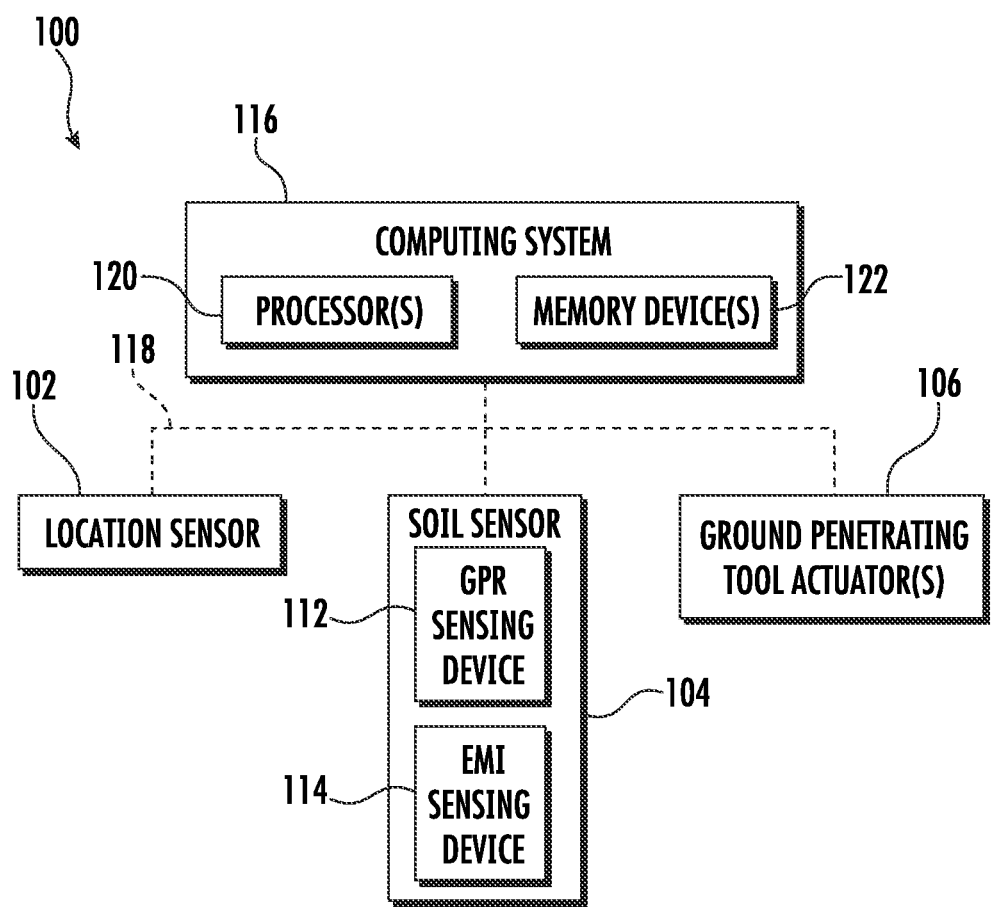
FIG. 3 illustrates a schematic view of one embodiment of a system for controlling the operation of an agricultural implement in accordance with aspects of the present subject matter.

Referring now to FIG. 3, a schematic view of one embodiment of a system 100 for controlling the operation of an agricultural implement is illustrated in accordance with aspects of the present subject matter. In general, the system 100 will be described herein with reference to the work vehicle 10 and the agricultural implement 12 described above with reference to FIGS. 1 and 2. However, it should be appreciated by those of ordinary skill in the art that the disclosed system 100 may generally be utilized with work vehicles having any other suitable vehicle configuration and/or agricultural implements having any other suitable implement configuration.

As shown in FIG. 3, the system 100 may include a soil sensor 104 provided in operative association with the vehicle 10 and/or the implement 12. In general, as mentioned above, the soil sensor 104 may be configured to capture data indicative of a subsurface soil compaction layer present within the field as the vehicle/implement 10/12 travels across the field. As such, in several embodiments, the soil sensor 104 may include a ground-penetrating radar (GPR) sensing device 112 and electromagnetic induction (EMI) sensing device 114. In such embodiments, the GPR sensing device 112 may be configured to capture GPR data associated with the soil present within the field of view or sensor detection range of the GPR sensing device 112. Similarly, the EMI sensing device 114 may be configured to capture EMI data associated with the soil present within the field of view or sensor detection range of the EMI sensing device 114. In this respect, the combination of GPR and EMI data may allow a three-dimensional representation of the soil to be generated (that could not be generated by GPR or EMI data alone). Such three-dimensional representation may, in turn, allow the position of the bottom surface of the compaction layer within the soil to be identified.

The GPR sensing device 112 may correspond to any suitable sensor or sensing device configured to capture data associated with the soil within the field using radio waves. For example, the GPR sensing device 112 may be configured to emit one or more radio wave output signals directed toward a portion of the soil within its field of view or sensor detection zone. A portion of the output signal(s) may, in turn, be reflected by the subsurface compaction layer as echo signal(s). Moreover, the GPR sensing device 112 may be configured to receive the reflected echo signal(s). In this regard, the time of flight, amplitude, frequency, and/or phase of the received echo signal(s) may be used to generate the three-dimensional representation (in combination with the EMI data) and/or determine the one or more parameters associated within the compaction (e.g., density).

Moreover, the EMI sensing device 114 may correspond to any suitable sensor or sensing device configured to capture data associated with the soil within the field using electromagnetic induction. For example, the EMI sensing device 114 may include a coil(s) or other inductor(s). In this respect, as the vehicle/implement 10/12 travels across the field, the compaction layer may induce a current within the coil. The current may, in turn, vary with the parameters of the compaction layer (e.g., position of the bottom surface, thickness, density, and/or the like). As such, the induced current may be used to generate the three-dimensional representation (in combination with the GPR data) and/or determine the one or more parameters associated within the compaction.

However, in alternative embodiments, the soil sensor 104 may be configured as any other suitable sensor(s) or sensing device(s) configured to capture data that can be used to identify the position of the bottom surface of the compaction layer as the vehicle/implement 10/12 travels across the field.

For example, in one embodiment, the soil sensor 104 may be a contact-based sensor, such as a cone penetrometer.

In accordance with aspects of the present subject matter, the system 100 may include a computing system 116 communicatively coupled to one or more components of the vehicle 10, the implement 12, and/or the system 100 to allow the operation of such components to be electronically or automatically controlled by the computing system 116. For instance, the computing system 116 may be communicatively coupled to the location sensor 102 via a communicative link 118. As such, the computing system 116 may be configured to receive data from the location sensor 102 that is indicative of the location of the vehicle/implement 10/12 within the field. Furthermore, the computing system 116 may be communicatively coupled to the soil sensor 104 via the communicative link 118. As such, the computing system 116 may be configured to receive data from the soil sensor 104 that is indicative of the compaction layer within the field as the vehicle/implement 10/12 travels across the field. Moreover, the computing system 116 may be communicatively coupled to the ground-penetrating tool actuator(s) 106 via the communicative link 118. In this respect, the computing system 116 may be configured to control the operation of the ground-penetrating tool actuator(s) 106 in a manner that controls the penetration depth(s) of the associated ground-penetrating tool(s) (e.g., the shanks 38). Additionally, the computing system 116 may be communicatively coupled to any other suitable components of the vehicle 10, the implement 12, and/or the system 100.

In general, the computing system 116 may comprise one or more processor-based devices, such as a given controller or computing device or any suitable combination of controllers or computing devices. Thus, in several embodiments, the computing system 116 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 122 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 122 may generally be configured to store suitable computer-readable instructions that, when implemented by the processor(s) 120, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a vehicle controller, an implement controller, a navigation controller, and/or the like.

Figure 4:
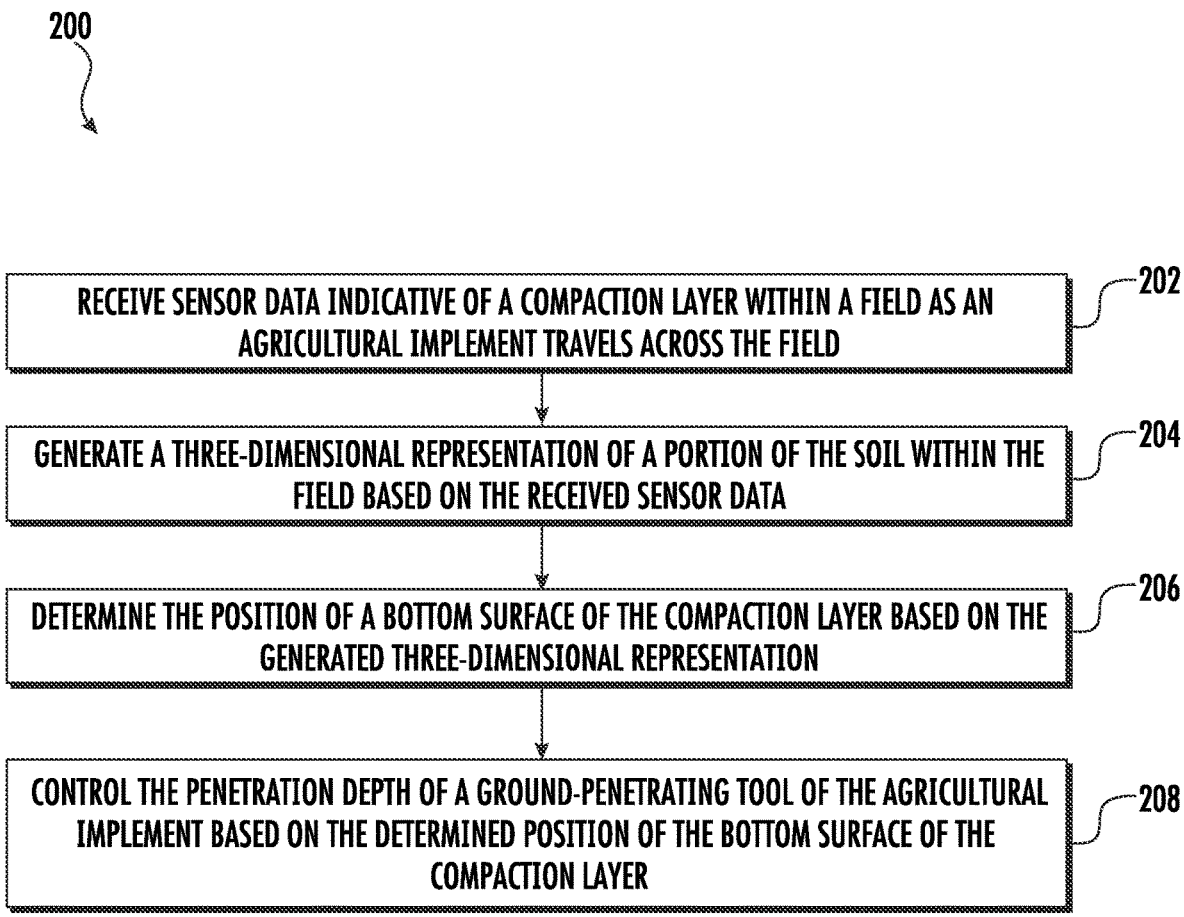
FIG. 4 illustrates a flow diagram of one embodiment of a method for controlling the operation of an agricultural implement in accordance with aspects of the present subject matter.

Referring now to FIG. 4, a flow diagram of one embodiment of a method 200 for controlling an operation of an agricultural implement is illustrated in accordance with aspects of the present subject matter. In general, the method 200 will be described herein with reference to the work vehicle 10, the agricultural implement 12, and the system 100 described above with reference to FIGS. 1-3. However, it should be appreciated by those of ordinary skill in the art that the disclosed method 200 may generally be implemented with any work vehicles having any suitable vehicle configuration, any agricultural implements having any suitable implement configuration, and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with a computing system, sensor data indicative of a compaction layer within a field as an agricultural implement travels across the field. For example, in several embodiments, as the vehicle/implement 10/12 travels across a field to perform a tillage operation thereon, the computing system 116 may receive data indicative of a compaction layer within the field from the soil sensor 104 (e.g., via the communicative link 118).

Figure 5:
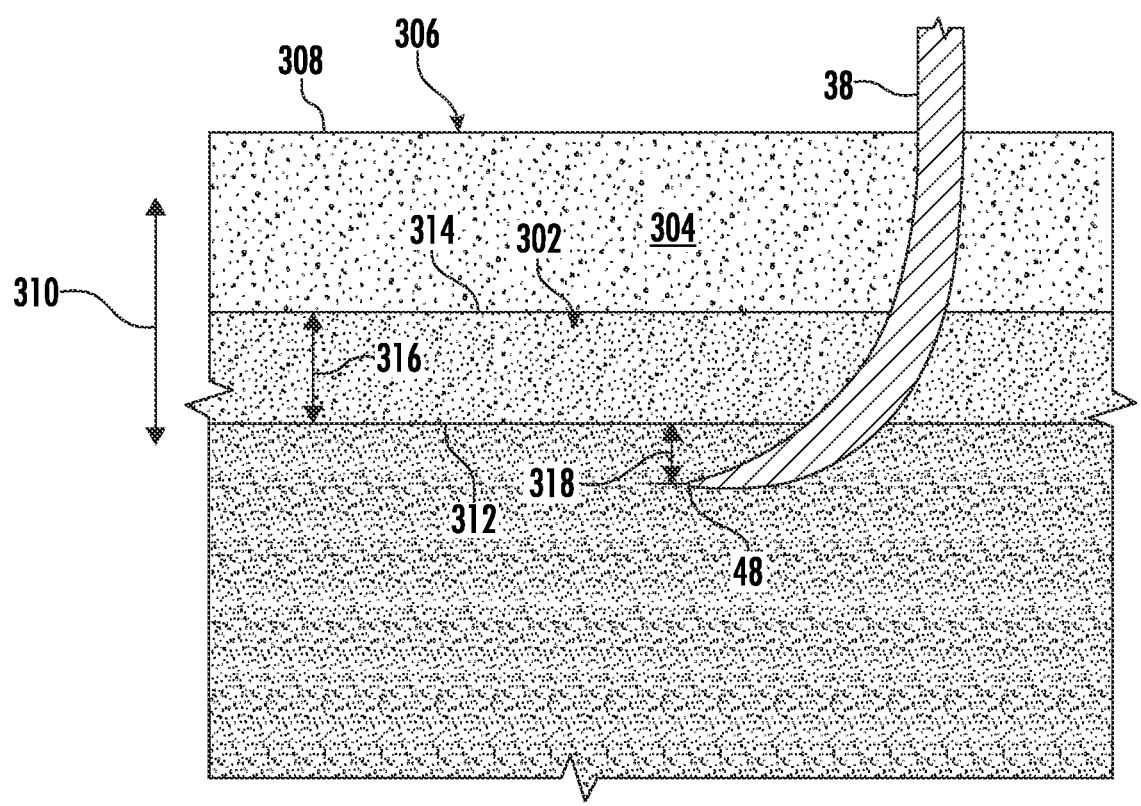
FIG. 5 illustrates a cross-sectional side view of one embodiment of a ground-penetrating tool of an agricultural implement penetrating into the soil of the field, particularly illustrating the position of the tool relative to a bottom surface of a compaction layer within the field.

In general, the compaction layer may correspond to any subsurface layer of soil that has been compacted, such as due to vehicle traffic, ponding, and/or the like. In this respect, the compaction layer may be a subsurface layer of soil having a greater density (i.e., reduced pore space) than the soil above and/or below the compaction layer. As such, the increased density of the compaction layer may impede the root growth of the crops planted within the field. For example, as shown in FIG. 5, a compaction layer 302 is present within soil 304 of a field 306. In particular, the compaction layer 302 is positioned below a top surface 308 of the field 306 along a vertical direction (indicated by arrow 310). Moreover, the compaction layer 302 extends in the vertical direction 310 between a bottom surface 312 of the compaction layer 302 and a top surface 314 of the compaction layer 302. Thus, the compaction layer 302 has a thickness (indicated by arrow 316) extending between the bottom and top surfaces 312, 314.

Additionally, as shown in FIG. 4, at (204), the method 200 may include generating, with the computing system, a representation of a portion of the soil within the field based on the received sensor data. Specifically, in several embodiments, the computing system 116 may be configured to analyze/process the received sensor data to generate a representation of a portion of the soil within the field. As such, the computing system 116 may include a suitable algorithm(s) stored within its memory device(s) 122 that, when executed by the processor 120, generates the representation from the data received from the sensor 104 (e.g., the GPR data captured by the GPR sensing device 112 and the EMI data captured by the EMI sensing device 114).

The representation of the portion of the soil within the field may correspond to any suitable data structure depicts or otherwise provides an indication of the soil structure adjacent to the field surface based on the received soil sensor data. For example, in several embodiments, the representation of the soil may correspond to a two-dimensional or three-dimensional image(s) or spatial model illustrating or depicting one or more subsurface soil layers. In this respect, the generated three-dimensional representation may provide an indication of various parameters associated with a subsurface soil compaction layer present within the field across which the vehicle/implement 10/12 is traveling. For example, such parameters may include the position or depth of the bottom and/or top surface of the compaction layer relative to the top surface of the field, the thickness of the compaction layer, and/or the like. However, in alternative embodiments, the three-dimensional representation of the soil may correspond to any other suitable type of data structure, such as one-dimensional representation or dataset.

In addition, at (204), the method 200 may include determining one or more parameters associated with the compaction layer based on the sensor data received at (202). For example, in one embodiment, the computing system 116 may be configured to determine the density of the compaction layer based on the received sensor data. In such an embodiment, the computing system 116 may include a look-up table(s), suitable mathematical formula, and/or an algorithm(s) stored within its memory device(s) 122 that correlates the received sensor data to the density(ies) of the compaction layer.

Moreover, at (206), the method 200 may include determining, with computing system, the position of a bottom surface of the compaction layer based on the generated representation. More specifically, in several embodiments, the computing system 116 may be configured to analyze the generated representation of the soil to determine the position of the bottom surface of the compaction layer (e.g., the depth or distance of the bottom surface of the compaction layer below the top surface of the field in the vertical direction). As such, the computing system 116 may include a suitable algorithm(s) stored within its memory device(s) 122 that, when executed by the processor 120, allows the position of the bottom surface of the compaction layer to be identified from the representation of the soil. As will be described below, the determined position of the bottom surface of the compaction layer may be used to control the penetration depths of the ground-penetrating tools (e.g., the shanks 38) of the implement 10.

Furthermore, in some embodiments, at (206), the method 200 may further include geo-locating the determined position of the bottom surface of the compaction layer within the field. More specifically, as the vehicle/implement 10/12 travels across the field, the computing system 116 may be configured to receive location data (e.g., coordinates) from the location sensor 102 (e.g., via the communicative link 118). Based on the known dimensional configuration and/or relative positioning between the soil sensor 104 and the location sensor 102, the computing system 116 may geo-locate each determination of the position of the bottom surface of the compaction layer within the field. For example, in one embodiment, the coordinates derived from the location sensor 102 and the compaction layer bottom surface determinations may both be time-stamped. In such an embodiment, the time-stamped data may allow the compaction layer bottom surface determinations to be matched or correlated to a corresponding set of location coordinates received or derived from the location sensor 102. Additionally, in some embodiments, the computing system 116 may be configured to generate a field map identifying the position of the bottom surface of the compaction layer at one or more locations within the field.

Additionally, in one embodiment, at (206), the method 200 may include determining one or more parameters associated with the compaction layer based on the representation of the soil generated at (204). For example, in one embodiment, the computing system 116 may be configured to analyze representation to the determine the thickness of the compaction layer (i.e., the distance between the bottom and top surfaces of the compaction layer in the vertical direction).

Moreover, at (208), the method 200 may include controlling, with computing system, the penetration depth of a ground-penetrating tool of the agricultural implement based on the determined position of the bottom surface of the compaction layer. More specifically, the computing system 116 may be configured to control the penetration depth(s) of one or more ground-penetrating tools of the implement 10 (e.g., the shanks 38) based on position of the bottom surface of the compaction layer determined at (206). For example, in some embodiments, the computing system 116 may transmit control signals to the ground-penetrating tool actuator(s) 106. The control signals may, in turn, instruct the actuators 106 to adjust the penetration depths of the tip(s) of the corresponding ground-penetrating tool(s).

In several embodiments, at (208), the method 200 may include controlling the penetration depth(s) of the ground-penetrating tool(s) such that the tip(s) of the tool(s) is positioned below the bottom surface of the compaction layer in the vertical direction. For example, in such embodiments, as the vehicle/implement 10/12 travels across the field, the computing system 116 may be configured to control the operation of the ground-penetrating tool actuator(s) 106 such that the tip(s) of the tool(s) is maintained below the bottom surface of the compaction layer.

Furthermore, in some embodiments, at (208), the method 200 may include controlling the penetration depth(s) of the ground-penetrating tool(s) such that the tip(s) of the ground-penetrating tool(s) is maintained at a selected distance below the bottom surface of the compaction layer in the vertical direction. More specifically, in such embodiments, as the vehicle/implement 10/12 travels across the field, the computing system 116 may be configured to control the operation of the ground-penetrating tool actuator(s) 106 such that the tip(s) of the tool(s) is positioned at a selected distance below the bottom surface of the compaction layer. For example, as shown in FIG. 5, the penetration depth of the tip 48 of the shank 38 is maintained at a selected distance (indicated by arrow 318) below the bottom surface 312 of the compaction layer 318 in the vertical direction 310. As will be described below, maintaining the ground-penetrating tool(s) at the selected distance below the bottom surface of the compaction layer 318 may generally improve the fracturing of the compaction layer.

In addition, in some embodiments, at (208), the method 200 may include determining the selected distance based one or more parameters associated with the compaction layer. More specifically, as described above, the computing system 116 may determine the position of the bottom surface of the compaction layer, the thickness of the compaction layer, and/or the density of the compaction layer. In this respect, the computing system 116 may determine the selected distance based on the position of the bottom surface of the compaction layer, the thickness of the compaction layer, the density of the compaction layer, the type of soil within the field, and/or the moisture content of the soil within the field. For example, the computing system 116 may include a look-up table(s), suitable mathematical formula, and/or an algorithm(s) stored within its memory device(s) 122 that correlates the compaction layer parameter(s) to the selected distance(s). However, in alternative embodiments, the selected distance may be determined based on any other suitable parameter(s) associated with the compaction layer.

Controlling the penetration depth(s) of the ground-penetrating tool(s) based on the position of the bottom surface of the compaction layer generally improves fracturing of the compaction layer. More specifically, thicker, denser, and/or deeper compaction layers generally require the tip(s) of the tool(s) to be position farther below the bottom surface of the compaction layer to fully fracture the compaction layer. In this respect, as described above, the selected distance between the tool(s) and the bottom surface of the compaction layer may be determined based on one or more parameters associated with the compaction layer. In this respect, by maintaining the tip(s) of the ground-penetrating tool(s) at a selected distance below the bottom surface of the compaction layer, the ground-penetrating tool(s) can more fully fracture the compaction layer than when the tool(s) simply penetrate into the compaction layer. Moreover, maintaining the tip(s) of the ground-penetrating tool(s) at the selected distance below the bottom surface of the compaction layer allows for full fracturing of the compaction without the large an unnecessary increase in draft load associated with sinking the tool(s) into the soil well below the depth of the compaction layer.

However, when the position of the bottom surface of the compaction layer cannot be determined at (206) (thereby indicating that no compaction layer is present within the field at the current location the vehicle/implement 10/12), the computing system 116 may control the operation of the ground-penetrating tool actuator(s) 106 such that the tip(s) of the tool(s) is positioned at a predetermined depth below the top surface of the field. The predetermined depth may be selected to fracture the soil within the seedbed of field but is generally less than the typical depths of the bottom surface of the compaction layer. Such positioning of the tool(s) when no compaction layer is present may reduce the draft load on the vehicle 10.

It is to be understood that the steps of the method 200 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the method 200, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling an operation of an agricultural implement, the system comprising:
   a ground-penetrating tool configured to penetrate soil within a field to a penetration depth;
   a sensor configured to capture data indicative of a compaction layer within the field as the agricultural implement travels across the field, the compaction layer extending in a vertical direction between a bottom surface of the compaction layer and a top surface of the compaction layer; and
   a computing system communicatively coupled to the sensor, the computing system configured to:
      generate a representation of a portion of the soil within the field based on the data captured by the sensor;
      determine a position of the bottom surface of the compaction layer based on the generated representation; and
      control the penetration depth of the ground-penetrating tool based on the determined position of the bottom surface of the compaction layer such that a tip of the ground-penetrating tool is positioned below the bottom surface of the compaction layer in the vertical direction.

2. The system of claim 1, wherein, when controlling the penetration depth of the ground-penetrating tool, the computing system is configured to control the penetration depth of the ground-penetrating tool such that the tip of the ground-penetrating tool is maintained at a selected distance below the bottom surface of the compaction layer in the vertical direction.

3. The system of claim 2, wherein the computing system is further configured to determine the selected distance based on the position of the bottom surface of the compaction layer.

4. The system of claim 2, wherein the computing system is further configured to:
   determine a thickness of the compaction layer extending between the bottom surface of the compaction layer and the top surface of the compaction layer based on the generated representation; and
   determine the selected distance based on the thickness of the bottom surface of the compaction layer.

5. The system of claim 2, wherein the computing system is further configured to:
   determine a density of the compaction layer based on the data captured by the sensor; and
   determine the selected distance based on the density of the compaction layer.

6. The system of claim 2, wherein the computing system is further configured to determine the selected distance based on a type of the soil within the field or a moisture content of the soil within the field.

7. The system of claim 1, wherein the sensor comprises a non-contact-based sensor.

8. The system of claim 7, wherein the sensor comprises a ground-penetrating radar sensing device and an electromagnetic induction sensing device.

9. The system of claim 1, wherein the computing system is further configured to generate a field map identifying the position of the bottom surface of the compaction layer at one or more locations within the field.

10. The system of claim 1, wherein the ground-penetrating tool comprises a shank.

11. A method for controlling an operation of an agricultural implement, the agricultural implement including a ground-penetrating tool configured to penetrate soil within a field to a penetration depth, the method comprising:
   receiving, with a computing system, sensor data indicative of a compaction layer within the field as the agricultural implement travels across the field, the compaction layer extending in a vertical direction between a bottom surface of the compaction layer and a top surface of the compaction layer;
   generating, with the computing system, a representation of a portion of the soil within the field based on the received sensor data;
   determining, with computing system, a position of the bottom surface of the compaction layer based on the generated representation; and
   controlling, with computing system, the penetration depth of the ground-penetrating tool based on the determined position of the bottom surface of the compaction layer such that a tip of the ground-penetrating tool is positioned below the bottom surface of the compaction layer in the vertical direction.

12. The method of claim 11, wherein controlling the penetration depth of the ground-penetrating tool comprises controlling, with the computing system, the penetration depth of the ground-penetrating tool such that the tip of the ground-penetrating tool is maintained at a selected distance below the bottom surface of the compaction layer in the vertical direction.

13. The method of claim 12, further comprising:
   determining, with the computing system, the selected distance based on the position of the bottom surface of the compaction layer.

14. The method of claim 12, further comprising:
   determining, with the computing system, a thickness of the compaction layer extending between the bottom surface of the compaction layer and the top surface of the compaction layer based on the generated representation; and
   determining, with the computing system, the selected distance based on the thickness of the bottom surface of the compaction layer.

15. The method of claim 12, further comprising:
   determining, with the computing system, a density of the compaction layer based on the received sensor data; and
   determining, with the computing system, the selected distance based on the density of the compaction layer.

16. The method of claim 12, further comprising:
   determining, with the computing system, the selected distance based on a type of the soil within the field or a moisture content of the soil within the field.

17. The method of claim 11, wherein the sensor data comprises a non-contact-based sensor data.

18. The method of claim 11, further comprising:
   generating, with the computing system, a field map identifying the position of the bottom surface of the compaction layer at one or more locations within the field.

* * * * *